(12) United States Patent
Huang

(10) Patent No.: US 12,447,683 B2
(45) Date of Patent: Oct. 21, 2025

(54) PRINT CUTTING MACHINE

(71) Applicant: Kuo-Tai Huang, Taichung (TW)

(72) Inventor: Kuo-Tai Huang, Taichung (TW)

( * ) Notice: Subject to any disclaimer, the term of this patent is extended or adjusted under 35 U.S.C. 154(b) by 173 days.

(21) Appl. No.: 18/431,818

(22) Filed: Feb. 2, 2024

(65) Prior Publication Data

US 2024/0293972 A1 Sep. 5, 2024

(30) Foreign Application Priority Data

Mar. 3, 2023 (TW) ................................. 112107725

(51) Int. Cl.
*B29C 64/379* (2017.01)
*B29C 64/30* (2017.01)
*B33Y 40/00* (2020.01)

(52) U.S. Cl.
CPC ............ *B29C 64/379* (2017.08); *B29C 64/30* (2017.08); *B33Y 40/00* (2014.12)

(58) Field of Classification Search
CPC .............................. B29C 64/30; B29C 64/379
See application file for complete search history.

(56) References Cited

U.S. PATENT DOCUMENTS

| | | | | |
|---|---|---|---|---|
| 4,850,844 A | * | 7/1989 | Hunting | B26F 3/12 83/16 |
| 5,657,679 A | * | 8/1997 | Hronas | B26D 1/547 83/16 |
| 2007/0227522 A1 | * | 10/2007 | Shibuya | B28D 1/088 125/21 |
| 2013/0170171 A1 | * | 7/2013 | Wicker | B33Y 70/00 29/832 |
| 2014/0220168 A1 | * | 8/2014 | Perez | B29C 37/0007 425/161 |
| 2020/0061871 A1 | * | 2/2020 | Gerade | B29C 64/245 |
| 2023/0321856 A1 | * | 10/2023 | Turcotte | B26F 3/12 83/13 |

* cited by examiner

*Primary Examiner* — Timothy Kennedy
(74) *Attorney, Agent, or Firm* — Justin Lampel

(57) ABSTRACT

A print cutting machine includes a main body, a moving unit, a cutting unit, a receiving unit, and a workpiece unit. The main body is provided with a receiving space, a first stand, two first slide rails, and two second slide rails. The moving unit is movably mounted on the first stand and includes a second stand, a moving seat, and a fitting seat. The second stand slides on the first stand linearly. The moving seat is moved on the second stand linearly. The fitting seat is mounted on the moving seat. The cutting unit is mounted on the two second slide rails. The receiving unit is received in the receiving space. The workpiece unit is assembled with the moving unit and includes a base, at least one molded portion mounted on the base, and at least one cutout.

7 Claims, 21 Drawing Sheets

PRINT CUTTING MACHINE

BACKGROUND OF THE INVENTION

Field of the Invention

The present invention relates to a print cutting machine.

Description of the Related Art

A conventional three-dimensional (3D) printer comprises a base and a workpiece mounted on the base. After the printing process is finished, a cutting tool, such as scissors, knives or the like, is used to perform a cutting action to cut and remove the workpiece from the base, to obtain a 3D printed product. The cutting tool is used to cut the workpiece made of plastic material. However, the cutting tool cannot be used to cut a workpiece made of metallic material with more structural strength.

BRIEF SUMMARY OF THE INVENTION

In accordance with the present invention, there is provided a print cutting machine comprising a main body, a moving unit, a cutting unit, a receiving unit, and a workpiece unit. The main body is provided with a receiving space, a first stand, two first slide rails, and two second slide rails. The moving unit is movably mounted on the first stand and includes a second stand, a moving seat, and a fitting seat. The second stand is provided with a vertical track. The second stand is mounted on the first stand and slides on the first stand linearly. The moving seat is mounted on a bottom of the second stand and moved on the second stand linearly. The fitting seat is mounted on a bottom of the moving seat. The cutting unit is mounted on the two second slide rails. The receiving unit is received in the receiving space. The workpiece unit is assembled with the moving unit and includes a base, at least one molded portion mounted on the base, and at least one cutout.

According to the primary advantages of the present invention, the cutting unit performs a cutting action on the workpiece unit without needing a manual cutting even if the at least one molded portion is made of metallic material or other material with greater structural strength.

According to another advantage of the present invention, when the moving unit is moved upward, the workpiece unit is also moved upward so that the at least one cutout aligns with the thread. The cutting unit is then moved horizontally to perform the cutting action on the workpiece unit.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
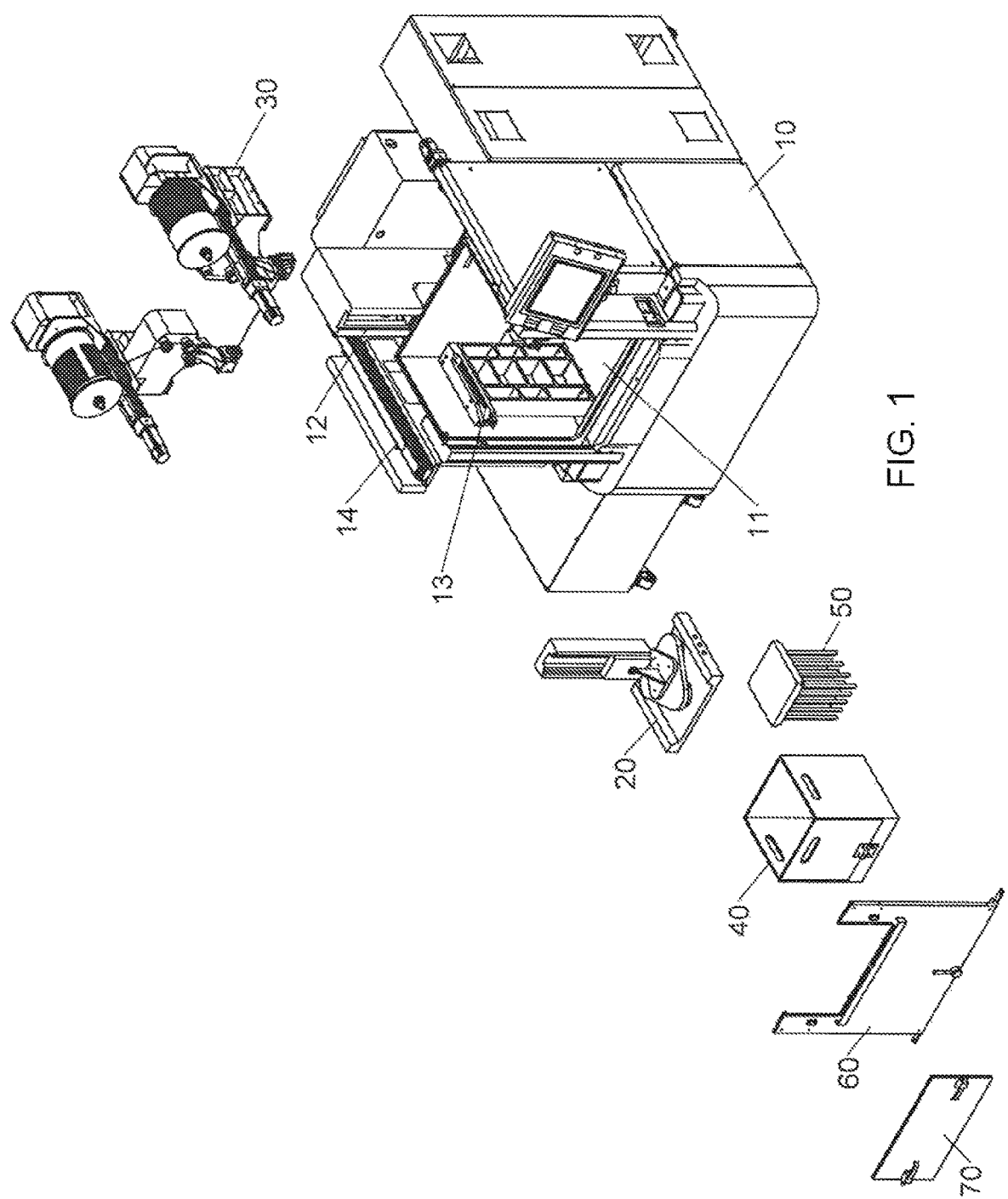
FIG. 1 is an exploded perspective view of a print cutting machine in accordance with the preferred embodiment of the present invention.
Figure 2:
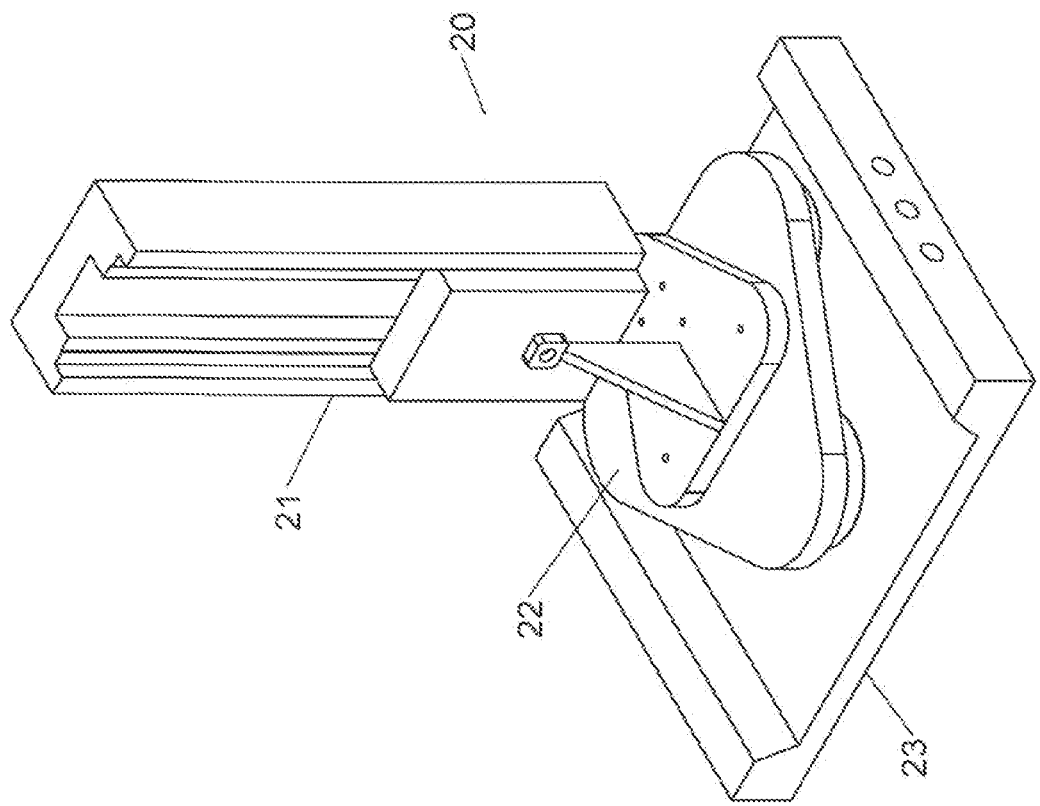
FIG. 2 is a perspective view of a moving unit of the print cutting machine in accordance with the preferred embodiment of the present invention.
Figure 3:
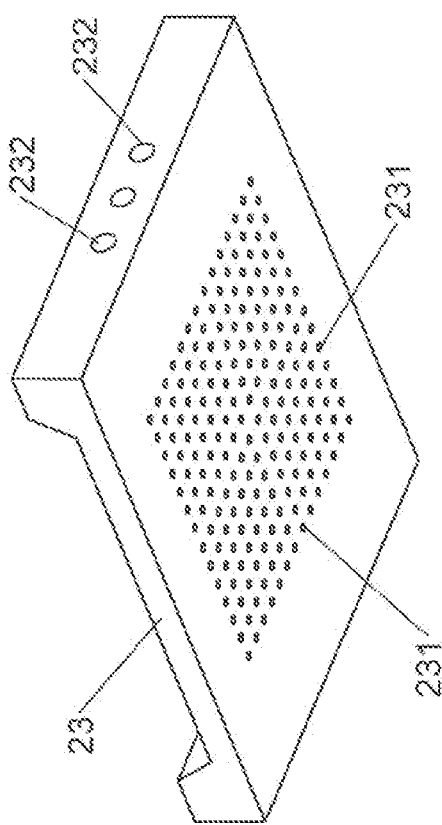
FIG. 3 is a perspective view of a fitting seat of the print cutting machine in accordance with the preferred embodiment of the present invention.
Figure 4:
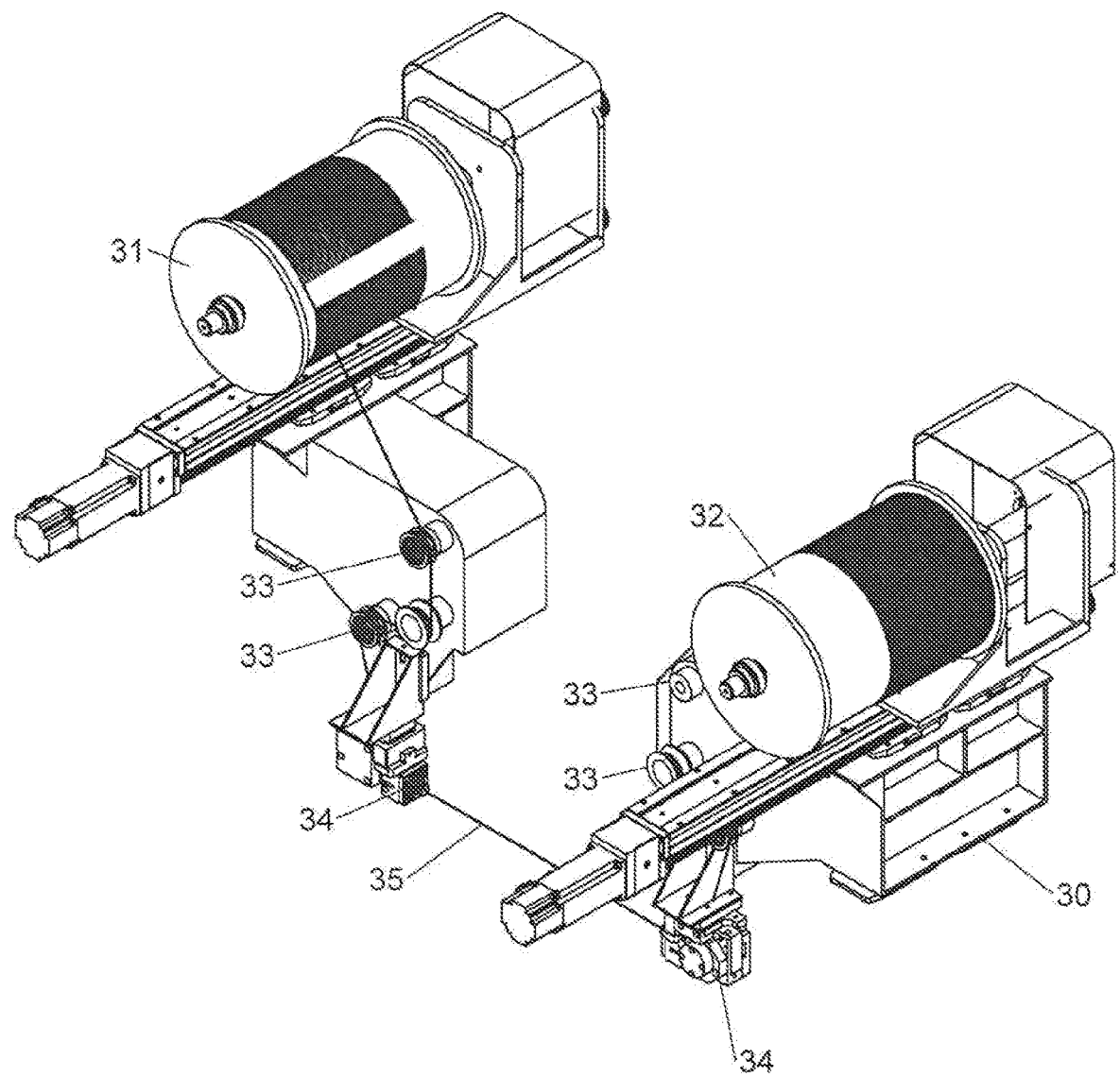
FIG. 4 is a perspective view of a cutting unit of the print cutting machine in accordance with the preferred embodiment of the present invention.
Figure 5:
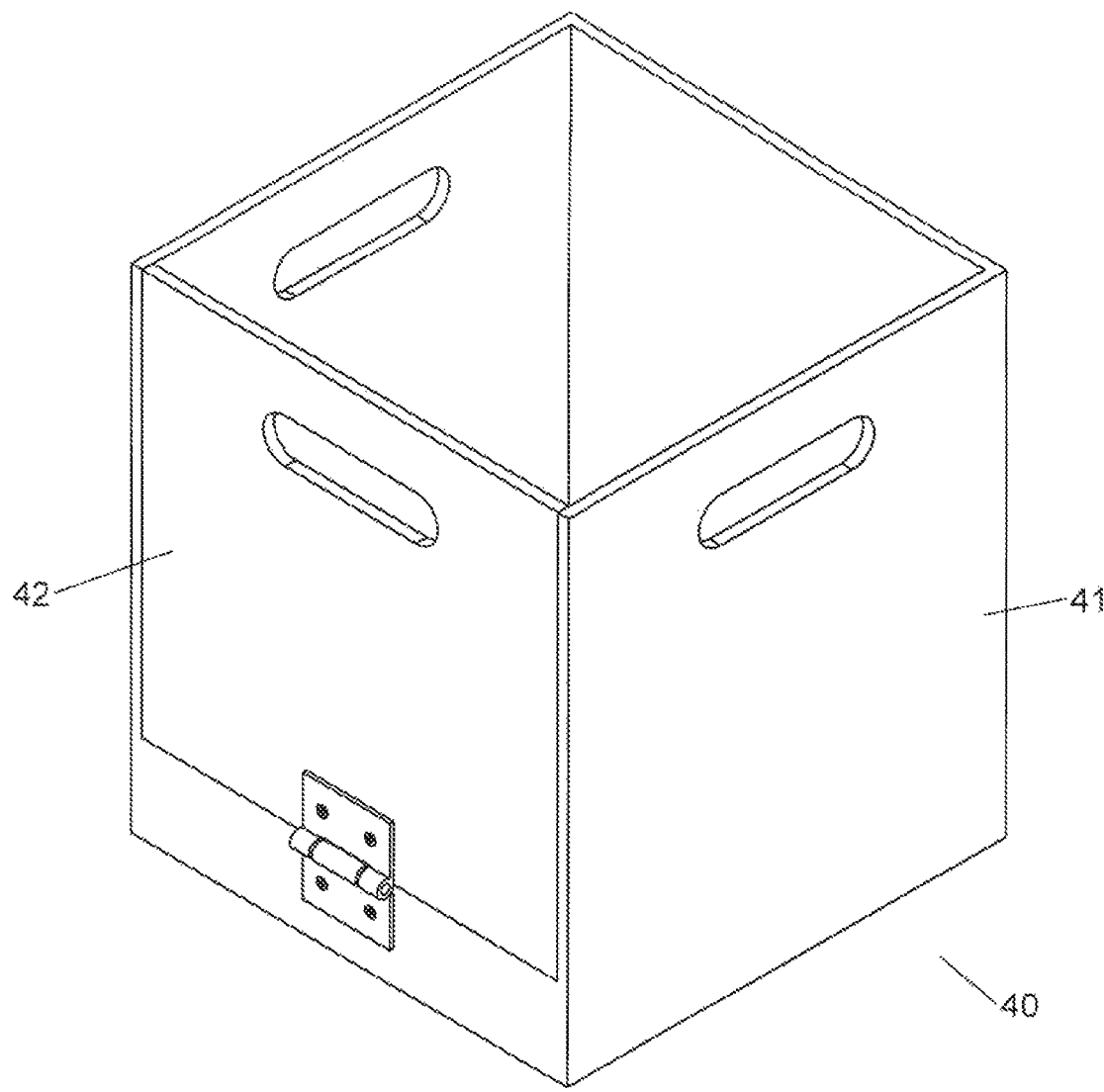
FIG. 5 is a perspective view of a receiving unit of the print cutting machine in accordance with the preferred embodiment of the present invention.
Figure 6:
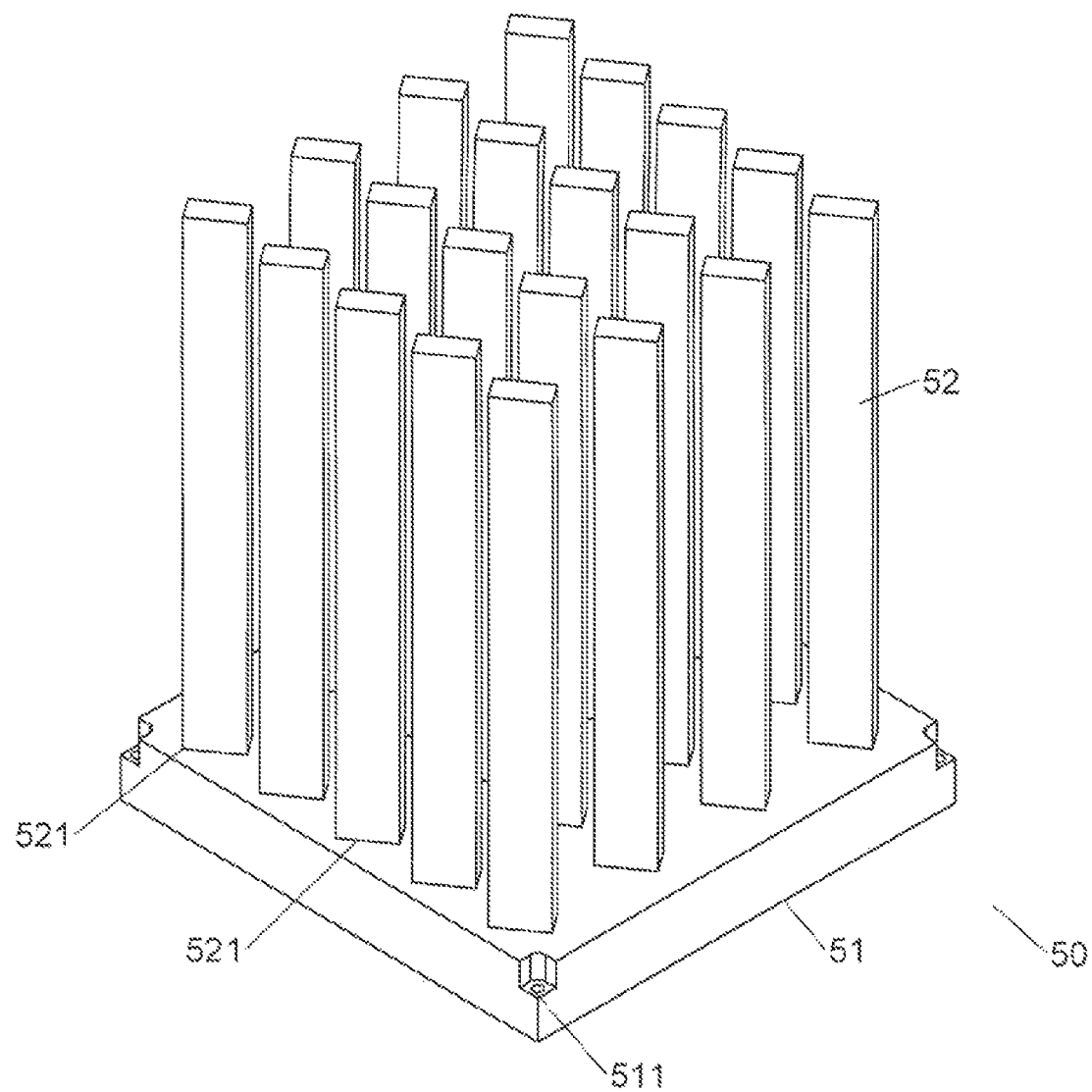
FIG. 6 is a perspective view of a workpiece unit of the print cutting machine in accordance with the preferred embodiment of the present invention.
Figure 7:
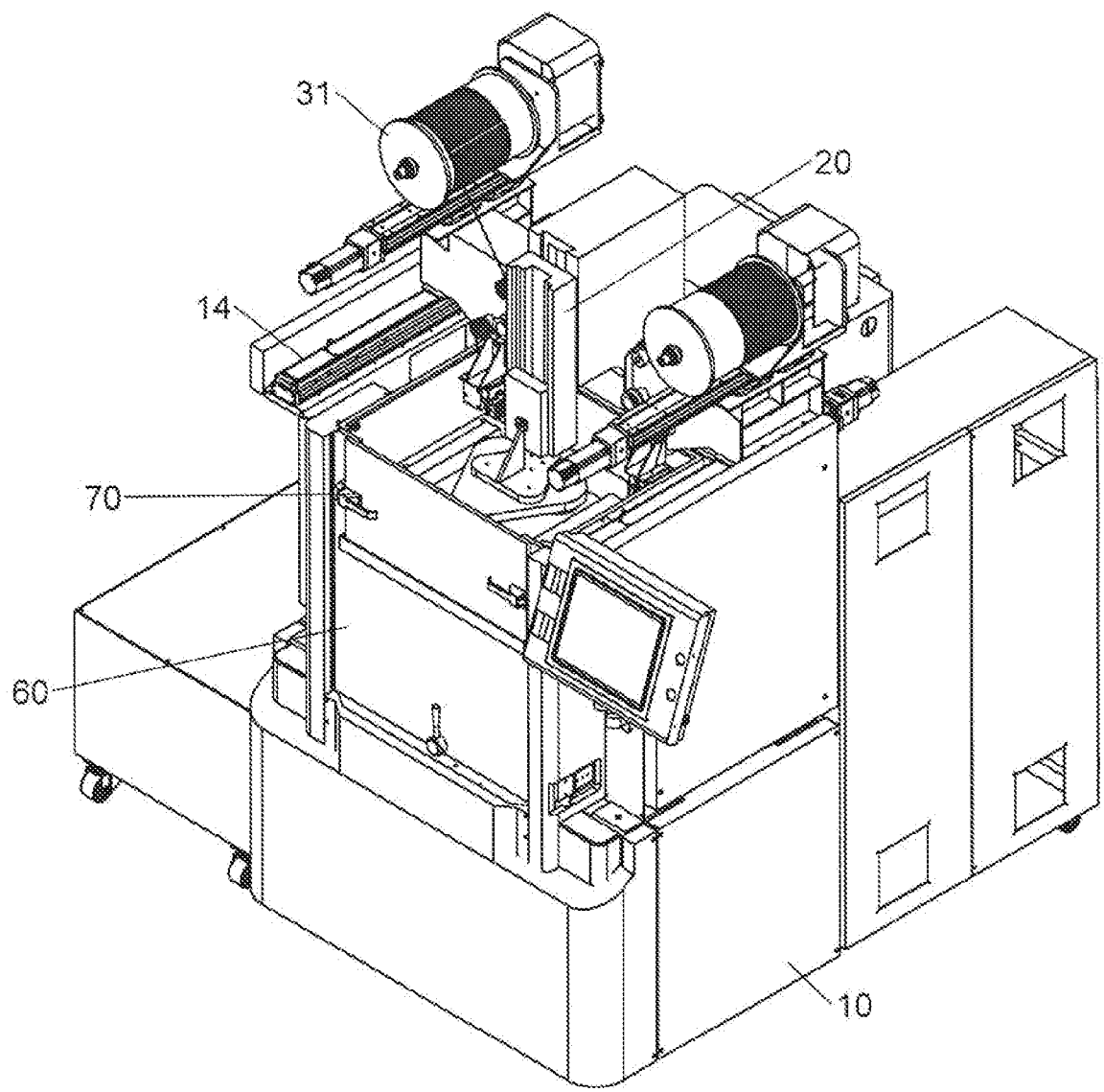
FIG. 7 is a perspective view of the print cutting machine in accordance with the preferred embodiment of the present invention.

Referring to the drawings and initially to FIGS. 1-7, a print cutting machine in accordance with the preferred embodiment of the present invention comprises a main body 10, a moving unit 20, a cutting unit 30, a receiving unit 40, and a workpiece unit 50.

The main body 10 has an interior provided with a receiving space 11 having an open top and an open front. The main body 10 is provided with a first stand 12 located at a rear side of the receiving space 11. The first stand 12 is provided with a vertical track. The receiving space 11 has two first slide rails 13 provided in two sides thereof. Each of the two first slide rails 13 is a horizontal track. The main body 10 has two second slide rails 14 provided on two sides thereof. Each of the two second slide rails 14 is a horizontal track having a height more than that of each of the two first slide rails 13. The main body 10 is provided with a monitor.

The moving unit 20 is movably mounted on the first stand 12 and includes a second stand 21, a moving seat 22, and a fitting seat 23.

The second stand 21 is provided with a vertical track. The second stand 21 is mounted on the first stand 12 and slides on the first stand 12 linearly. The moving seat 22 is mounted on a bottom of the second stand 21 and moved on the second stand 21 linearly. The fitting seat 23 is mounted on a bottom of the moving seat 22 and has a bottom provided with multiple first fitting portions 231. Each of the first fitting portions 231 is a screw hole. The fitting seat 23 has two sides each provided with multiple second fitting portions 232. Each of the second fitting portions 232 is a hole. Preferably, each of the two sides of the fitting seat 23 has three second fitting portions 232.

The cutting unit 30 is mounted on the two second slide rails 14 and moved the two second slide rails 14 horizontally. The cutting unit 30 includes a first spool 31, a second spool 32, multiple rollers 33, two support seats 34, and a thread (or wire) 35.

The first spool 31 and the second spool 32 are arranged at two sides of the receiving space 11. The first spool 31 is provided with a first power member which drives the first spool 31 to rotate in one direction. The second spool 32 is provided with a second power member which drives the second spool 32 to rotate in another direction. The first spool 31 and the second spool 32 are rotated in different directions. Each of the first spool 31 and the second spool 32 is a cylinder.

The rollers 33 are arranged beneath the first spool 31 and the second spool 32 and are located at different height positions. Each of the rollers 33 is an idler wheel.

The two support seats 34 are arranged beneath the rollers 33 and are opposite to each other.

The thread 35 is wound around the first spool 31 and the second spool 32. The thread 35 in turn passes the first spool 31, the rollers 33, one of the two support seats 34, the other one of the two support seats 34, the rollers 33, and the second spool 32. The first spool 31 is rotated to unwind the thread 35, and the second spool 32 is rotated to wind the thread 35. The thread 35 is supported by and horizontally stretched between the two support seats 34. The thread 35 is moved between the two support seats 34.

The two support seats 34 and the thread 35 are received in the receiving space 11 to perform a cutting process.

The receiving unit 40 is received in the receiving space 11 and has a height less than that of the two first slide rails 13. The receiving unit 40 includes a box 41 and a first door 42. The box 41 has an open top with an opening aligning with a bottom of the moving unit 20. The first door 42 is pivotally mounted on a front of the box 41 and aligns with the front of the receiving space 11. The first door 42 is movable relative to the box 41 to open or close the box 41.

The workpiece unit 50 is assembled with the moving unit 20. When the moving unit 20 is moved upward vertically, the moving unit 20 drives the workpiece unit 50 to move vertically. The workpiece unit 50 includes a base 51, at least one molded portion 52 mounted on the base 51, and at least one cutout (or severed portion) 521 formed between the base 51 and the at least one molded portion 52. The base 51 is assembled with the fitting seat 23 and provided with multiple third fitting portions 511. The third fitting portions 511 are assembled with the first fitting portions 231 by multiple screws. The third fitting portions 511 are arranged on four corners of the base 51. The at least one molded portion 52 and the at least one cutout 521 are received in the receiving unit 40. Preferably, the workpiece unit 50 includes multiple molded portions 52 and multiple cutouts 521. The molded portions 52 are arranged to form a matrix, and a distance is defined between the molded portions 52.

The workpiece unit 50 is initially assembled with the fitting seat 23. The fitting seat 23 and the workpiece unit 50 are moved into the receiving space 11. The fitting seat 23 is situated on the two first slide rails 13 and moved on the two first slide rails 13 horizontally. The fitting seat 23 is then assembled with the moving seat 22. When the moving unit 20 is moved vertically, the moving seat 22 is moved away from the two first slide rails 13.

The base 51 has a size matching that of the box 41. The at least one molded portion 52 is made of metallic or nonmetallic material and is printed by a three-dimensional (3D) printer.

A second door 60 is mounted on the open front of the receiving space 11. The second door 60 is movable relative to the main body 10 to open or close the main body 10. The second door 60 is directly removed from the main body 10.

A third door 70 is mounted on the second door 60 and aligns with the moving unit 20. The third door 70 is movable relative to the second door 60 to open or close the second door 60. The third door 70 is directly removed from the second door 60.

Figure 8:
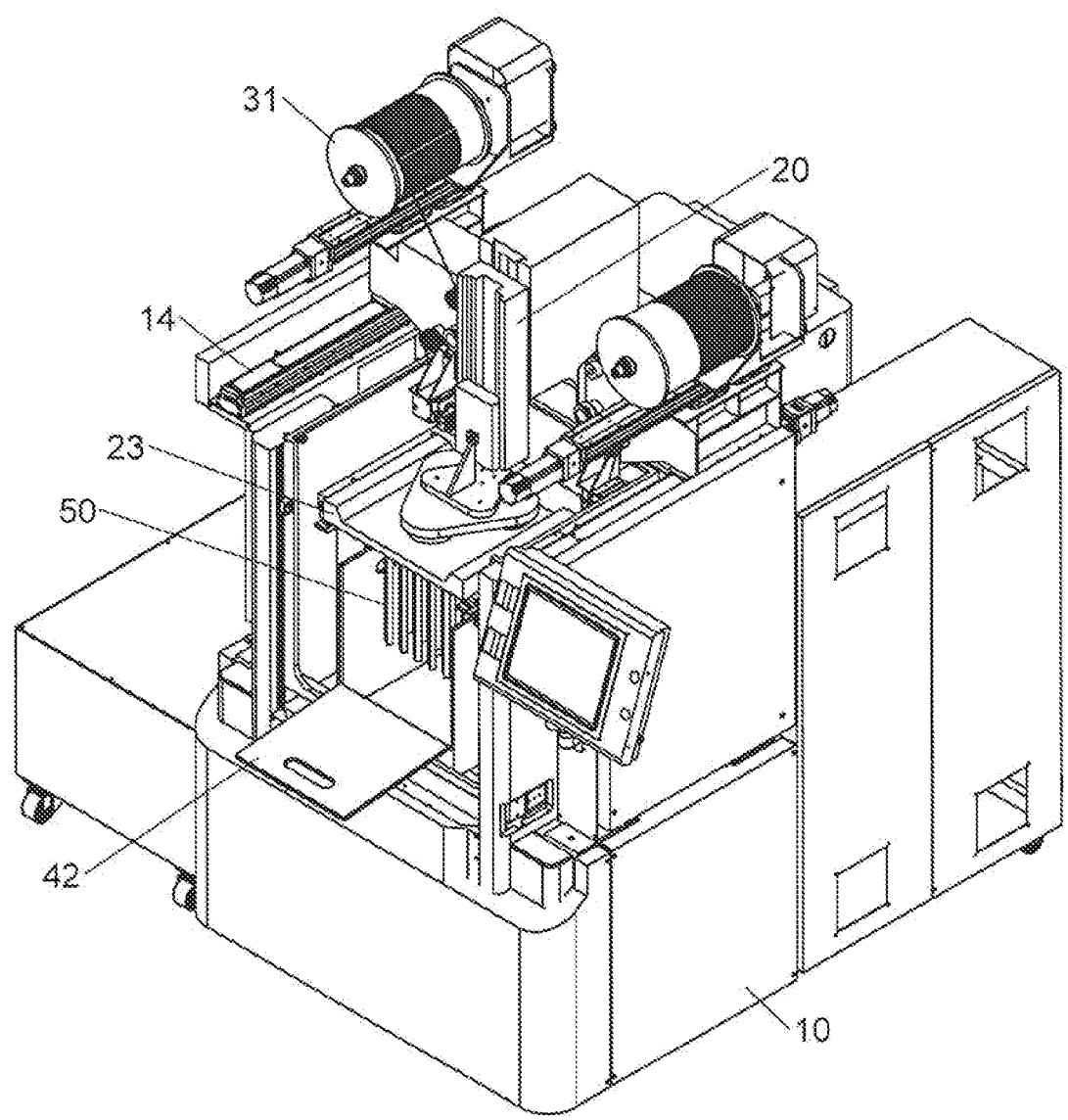
FIG. 8 is a perspective view of the print cutting machine with the first door being opened.
Figure 9:
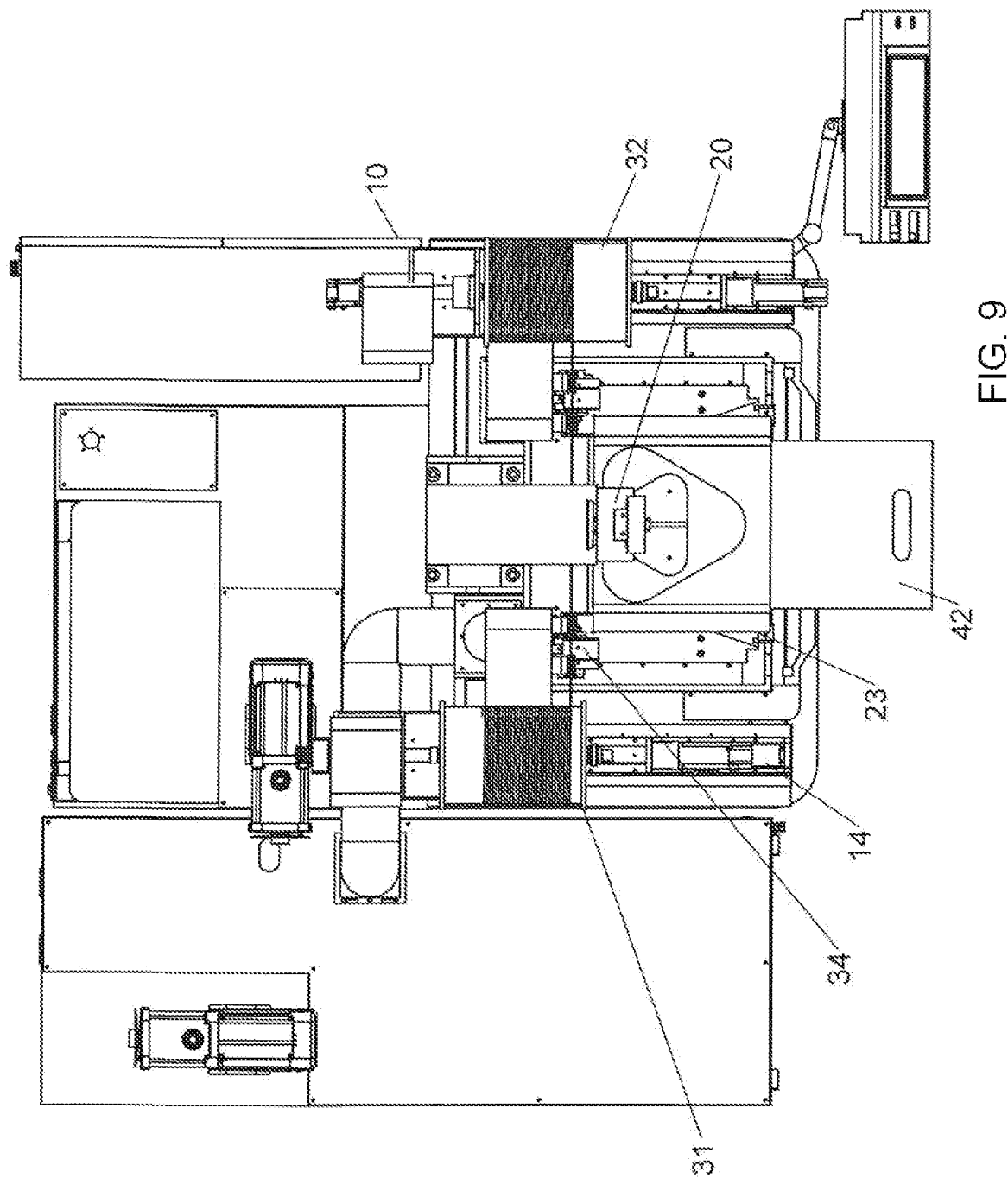
FIG. 9 is a top view of the print cutting machine as shown in FIG. 8.

Referring to FIGS. 8 and 9 with reference to FIGS. 1-7, the first door 42 is opened, the second door 60 is removed from the main body 10, and the third door 70 is removed from the second door 60. The fitting seat 23 is situated on the two first slide rails 13. The cutting unit 30 is mounted on the two second slide rails 14. The receiving unit 40 is received in the receiving space 11. The workpiece unit 50 is assembled with the bottom of the moving unit 20. The at least one molded portion 52 is received in the box 41.

After the second door 60 is mounted on the main body 10, and the third door 70 is mounted on the second door 60, liquid is filled into the receiving space 11, so that the receiving unit 40 and the workpiece unit 50 are immersed in the liquid partially or entirely.

Figure 10:
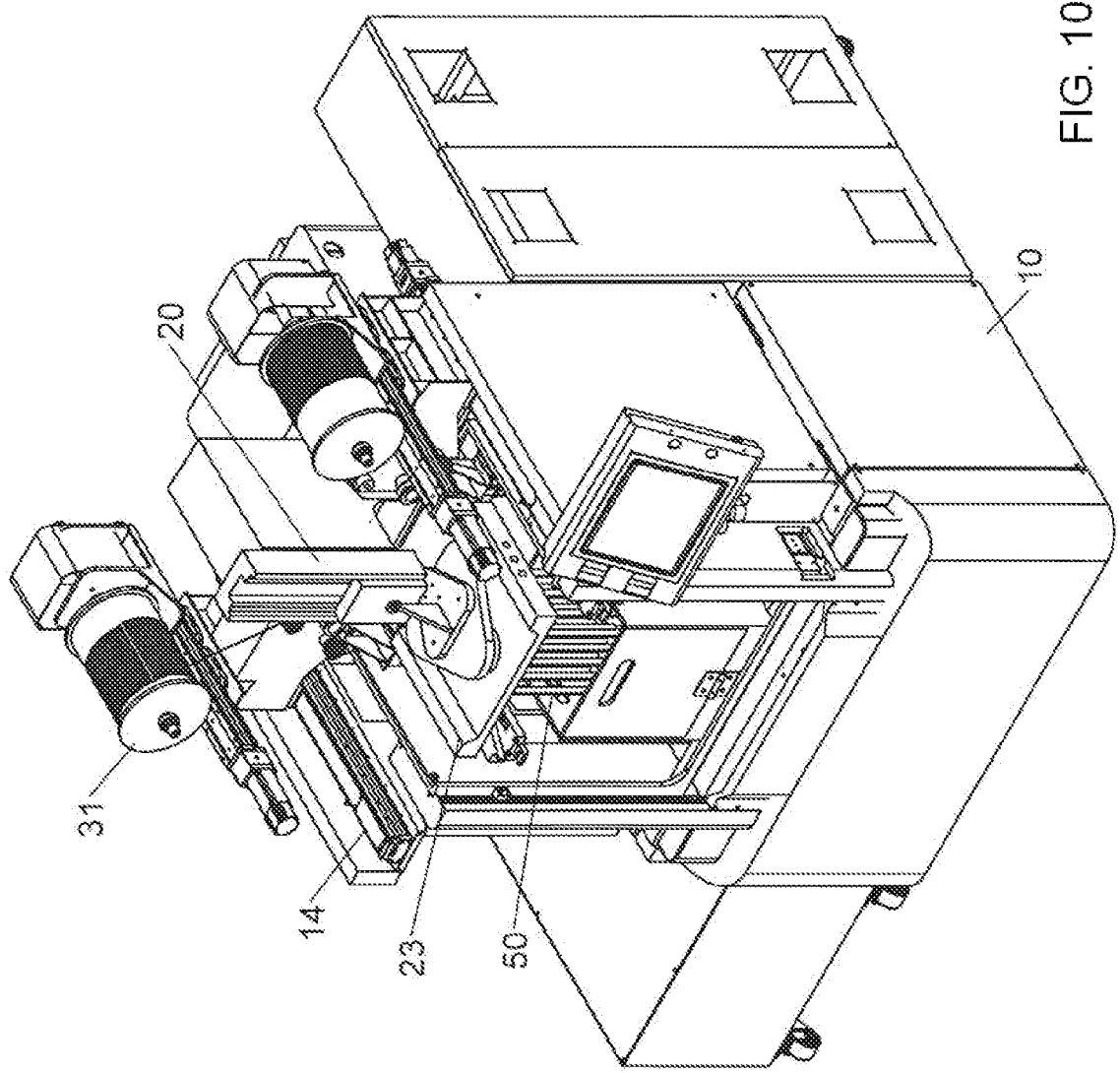
FIG. 10 is a perspective view showing a first operation state of the print cutting machine.
Figure 11:
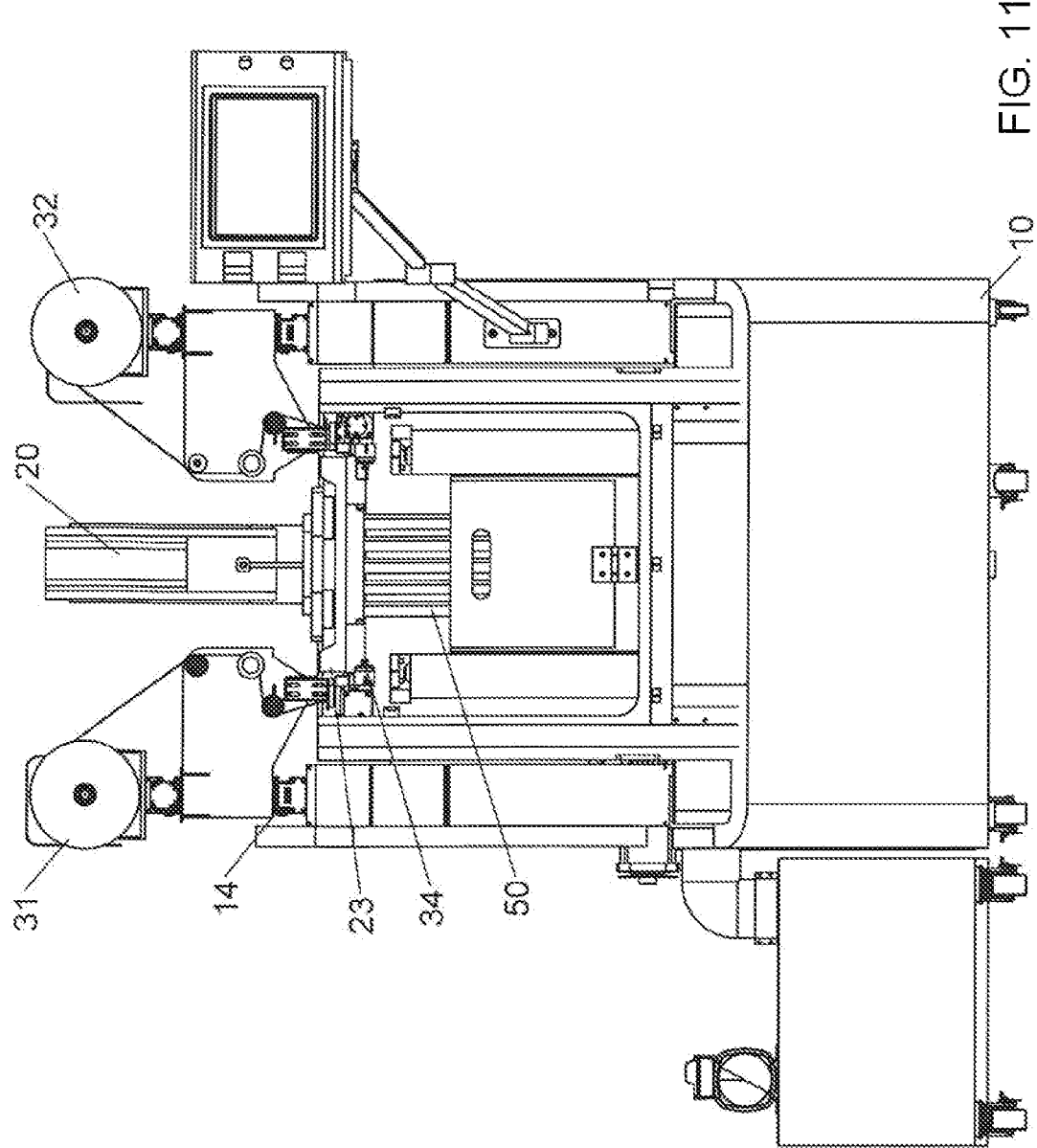
FIG. 11 is a front view of the print cutting machine as shown in FIG. 10.
Figure 12:
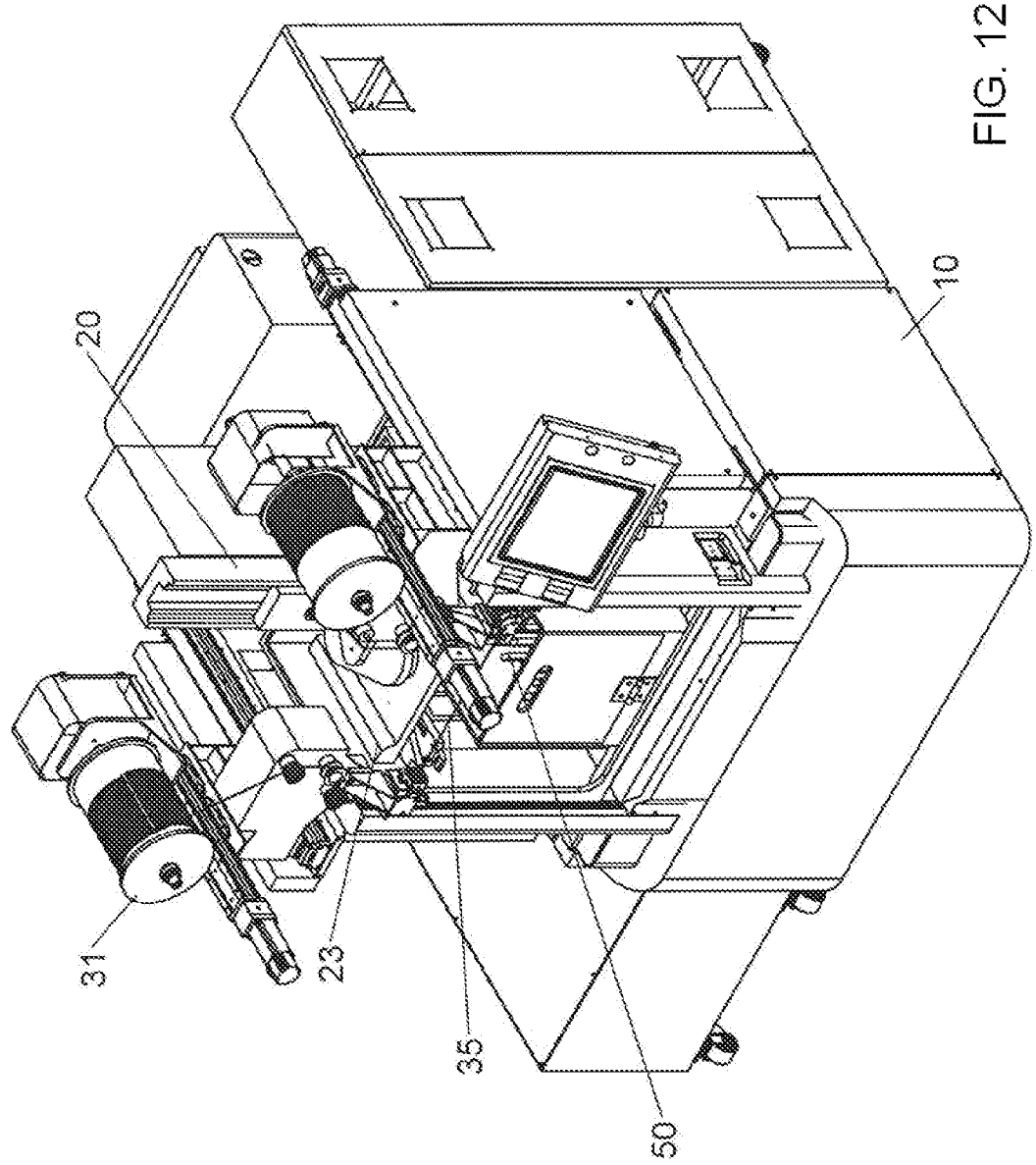
FIG. 12 is a perspective view showing a second operation state of the print cutting machine.
Figure 13:
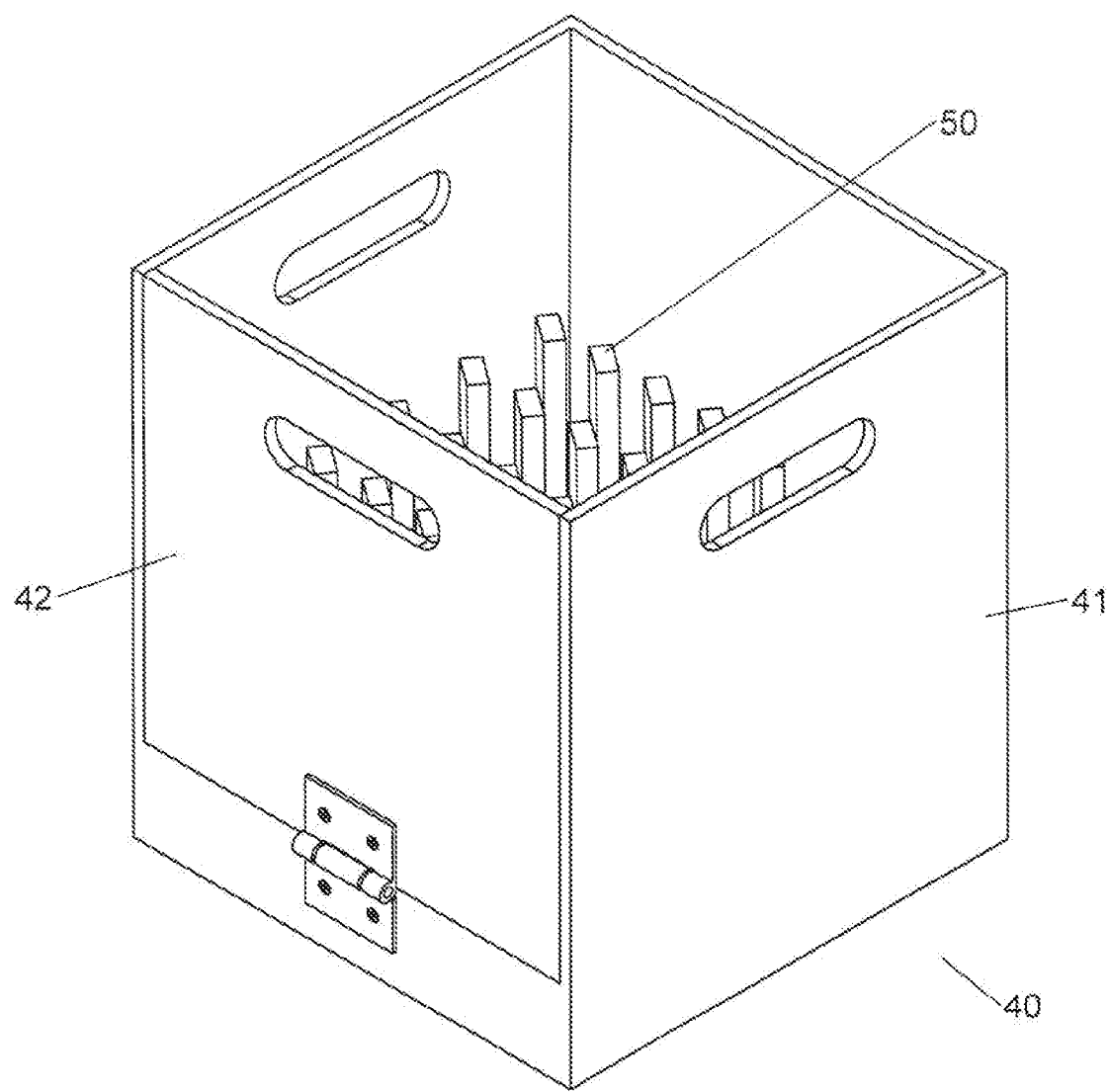
FIG. 13 is a perspective view showing the receiving unit under the second operation state of the print cutting machine.

Referring to FIGS. 10-13 with reference to FIGS. 1-9, the second door 60 and the third door 70 are hidden. In operation, the workpiece unit 50 is moved upward with the moving unit 20, so that the at least one cutout 521 aligns with the thread 35 as shown in FIGS. 10 and 11. The cutting unit 30 is then moved horizontally, with the first spool 31 being rotated to unwind the thread 35, and with the second spool 32 being rotated to wind the thread 35. The thread 35 is stretched between the two support seats 34 and aligns with the at least one cutout 521. The thread 35 is curled and moved to cut the at least one cutout 521 as shown in FIG. 12, so that the at least one molded portion 52 is dropped into and gathered by the box 41 as shown in FIG. 13.

The liquid is filled into the receiving space 11, to provide a buffering effect to the at least one molded portion 52, to prevent the at least one molded portion 52 from hitting the bottom of the box 41, thereby preventing the box 41 from being damaged.

Figure 14:
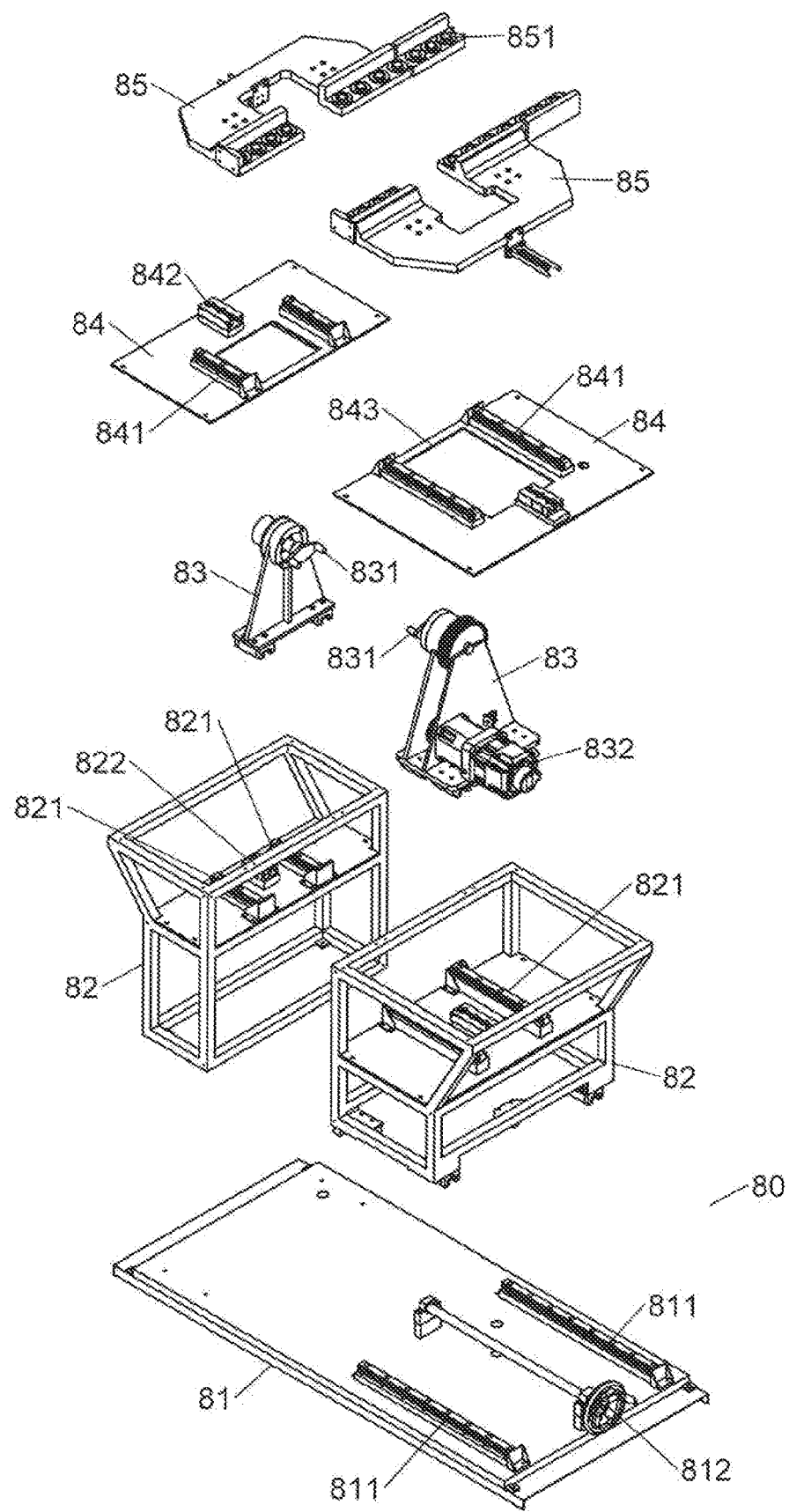
FIG. 14 is an exploded perspective view of a conveying mechanism of the print cutting machine in accordance with the preferred embodiment of the present invention.
Figure 15:
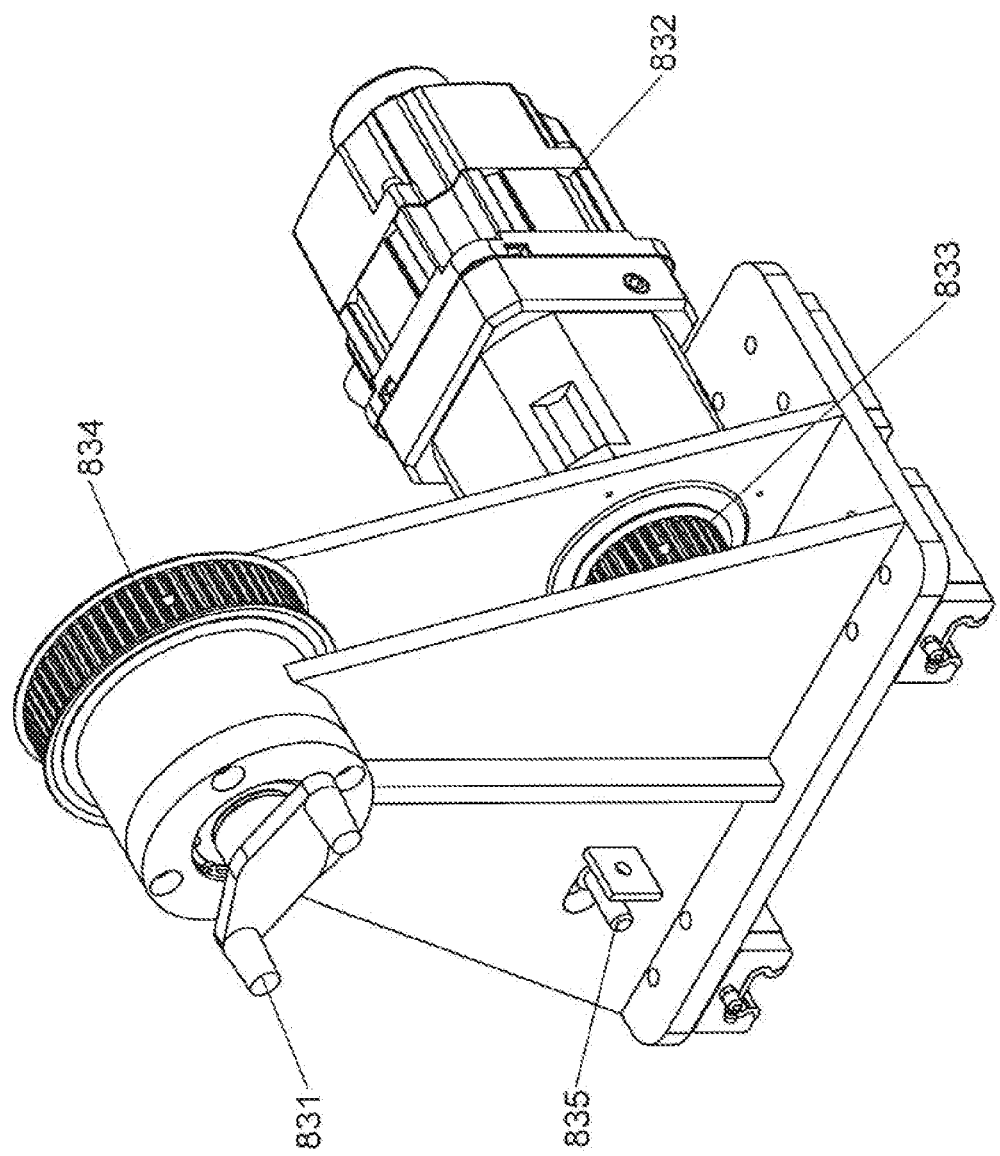
FIG. 15 is a perspective view of a rotation unit of the print cutting machine in accordance with the preferred embodiment of the present invention.
Figure 16:
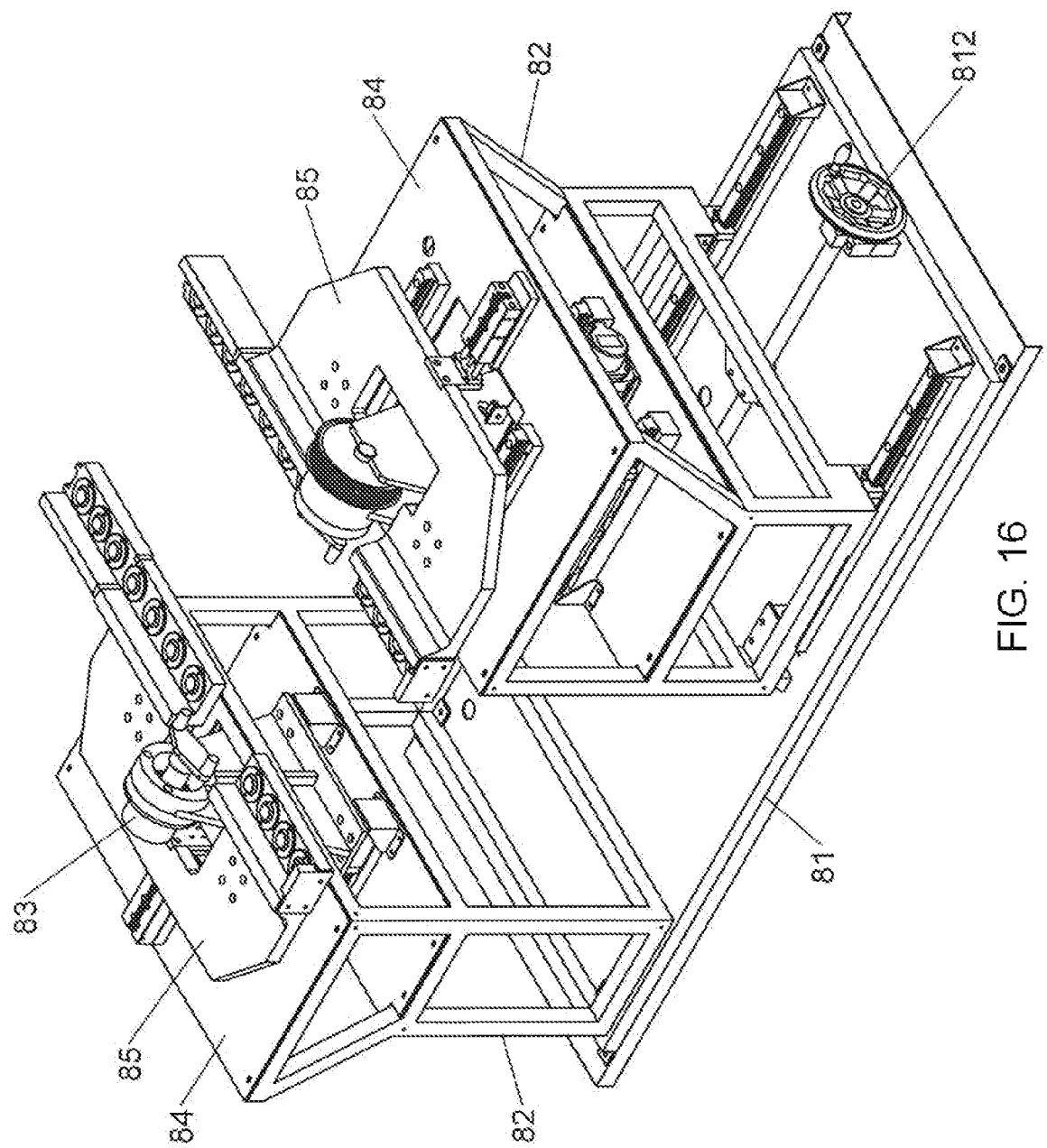
FIG. 16 is a perspective view of the conveying mechanism of the print cutting machine in accordance with the preferred embodiment of the present invention.

Referring to FIGS. 14-16 with reference to FIGS. 1-7, the print cutting machine further comprises a conveying mechanism 80 for inverting and delivering the workpiece unit 50 and the fitting seat 23 into the receiving space 11. The conveying mechanism 80 includes a first machine base 81, two second machine bases 82, two rotation units 83, two third machine bases 84, and two fourth machine bases 85.

The first machine base 81 is a sheet plate with determined length and width. The first machine base 81 is provided with two first tracks 811 located at two sides thereof. The first machine base 81 is provided with a first moving (or driving) element 812 located between the two first tracks 811.

The first moving element 812 is a threaded rod (or lead screw) that is rotated to provide a micro-adjusting function.

A first one of the two second machine bases 82 is mounted on the first machine base 81. A second one of the two second machine bases 82 is mounted on the two first tracks 811 and assembled with the first moving element 812. The second one of the two second machine bases 82 is moved on the two first tracks 811 horizontally to adjust a distance between the two second machine bases 82. Each of the two second machine bases 82 is provided with two second tracks 821. Each of the two second machine bases 82 is provided with a second moving (or driving) element 822 located between the two second tracks 821.

The second moving element 822 includes an oil cylinder structure, a pneumatic cylinder structure or the like.

Each of the two rotation units 83 is mounted on the two second tracks 821 respectively. The two rotation units 83 clamp the fitting seat 23 and invert the fitting seat 23 and the workpiece unit 50. Each of the two rotation units 83 is mounted on the second moving element 822. Each of the two rotation units 83 includes a fixing (or locking or retaining or fastening) portion 831, a power element 832, a first wheel 833, a second wheel 834, and an adjusting portion 835. The fixing portion 831 aligns with the second fitting portions 232. The power element 832 is a power source of each of the two rotation units 83. The second wheel 834 is arranged above the first wheel 833. The fixing portion 831 is mounted on the second wheel 834.

In operation, the workpiece unit 50 is initially assembled with the fitting seat 23 by multiple screws.

When the second moving element 822 is operated, the second moving element 822 drives each of the two rotation units 83 to move on the two second tracks 821 horizontally, so that the two rotation units 83 approach each other. When the fixing portion 831 is locked on the second fitting portions 232, the two rotation units 83 clamp the fitting seat 23. The power element 832 drives the first wheel 833, the second wheel 834, and the fixing portion 831 to rotate through one hundred and eighty degrees (180°), so that the fitting seat 23 and the workpiece unit 50 are inverted and rotated through one hundred and eighty degrees (180°).

When the second moving element 822 is operated reversely, the second moving element 822 drives each of the two rotation units 83 to move reversely, so that the two rotation units 83 are away from each other, and the fixing portion 831 is detached from the second fitting portions 232.

The two third machine bases 84 are mounted on the two second machine bases 82 respectively. Each of the two third machine bases 84 is provided with two third tracks 841, a third moving (or driving) element 842, and a slot 843. The slot 843 allows passage of each of the two rotation units 83.

The third moving element 842 includes an oil cylinder structure, a pneumatic cylinder structure or the like.

The two fourth machine bases 85 are assembled with the two third machine bases 84 respectively. The third moving element 842 is operated to drive each of the two fourth machine bases 85 so that each of the two fourth machine bases 85 is moved on the two third tracks 841, and the two fourth machine bases 85 are moved to be close to each other or away from each other. Each of the two fourth machine bases 85 is provided with a fourth track 851. The fitting seat 23 is slidable on the fourth track 851. The fourth track 851 has a height equal to that of each of the two first slide rails 13 so that the fitting seat 23 slides on the fourth track 851 into the two first slide rails 13, and the workpiece unit 50 is moved into the receiving space 11.

The two rotation units 83 are slidable relative to the two second machine bases 82 respectively, the two third machine bases 84 are mounted on the two second machine bases 82 respectively, and the two fourth machine bases 85 are slidable relative to the two third machine bases 84 respectively, so that the two rotation units 83 are moved independently, and the two fourth machine bases 85 are moved independently.

Figure 17:
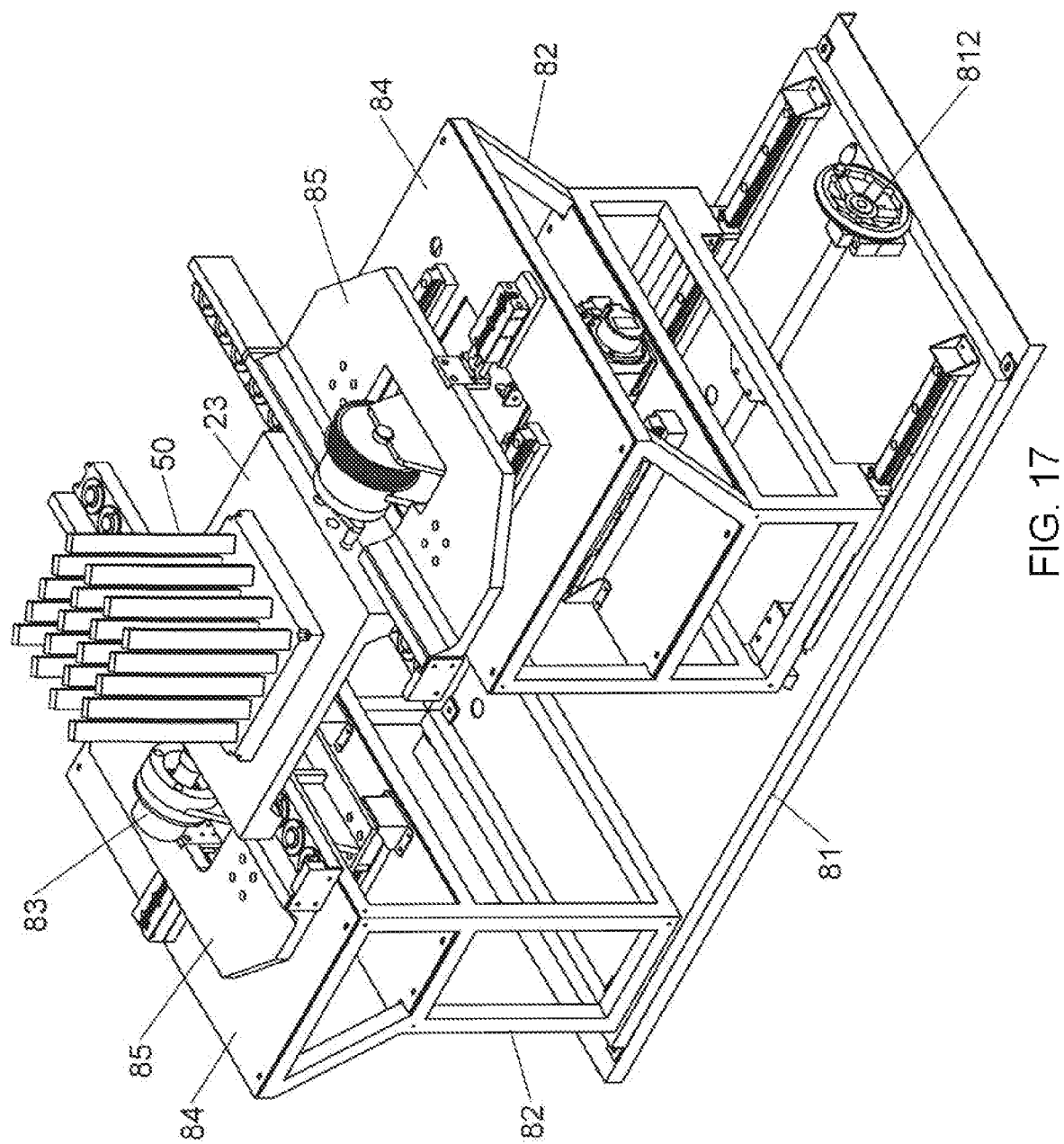
FIG. 17 is a perspective view showing a first operation state of the conveying mechanism of the print cutting machine.

Referring to FIGS. 17-22 with reference to FIGS. 1-16, the two second machine bases 82 are mounted on the first machine base 81 and the two first tracks 811 respectively. Each of the two rotation units 83 is mounted on the two second tracks 821 respectively. The two third machine bases 84 are mounted on the two second machine bases 82 respectively. Each of the two fourth machine bases 85 is mounted on the two third tracks 841. The fixing portion 831 aligns with the second fitting portions 232 as shown in FIG. 17. The first moving element 812 is operated to adjust a distance between the two second machine bases 82. The second moving element 822 is operated to adjust a distance between the two rotation units 83. The third moving element 842 is operated to adjust a distance between the two fourth machine bases 85.

Figure 18:
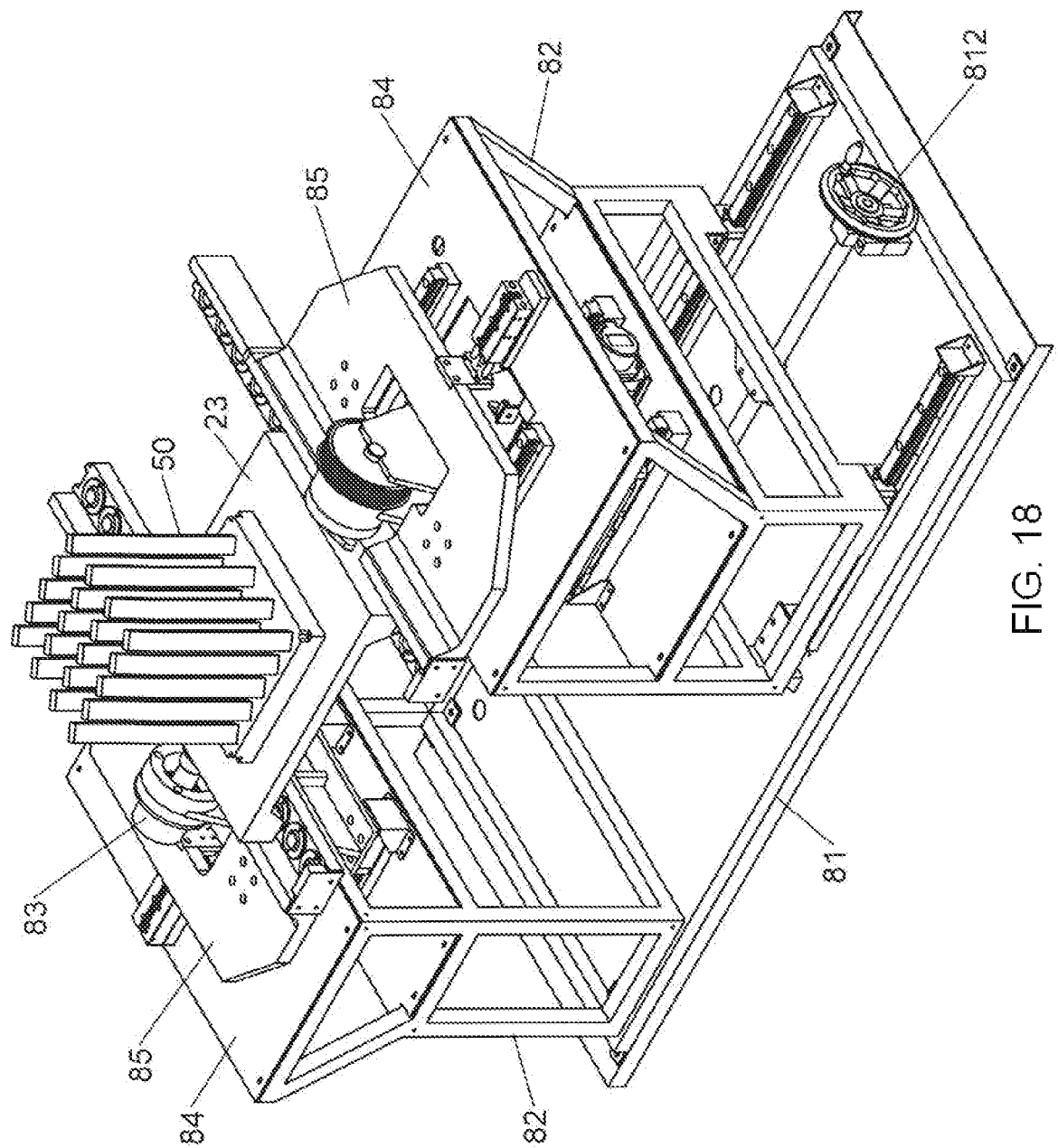
FIG. 18 is a perspective view showing a second operation state of the conveying mechanism of the print cutting machine.
Figure 19:
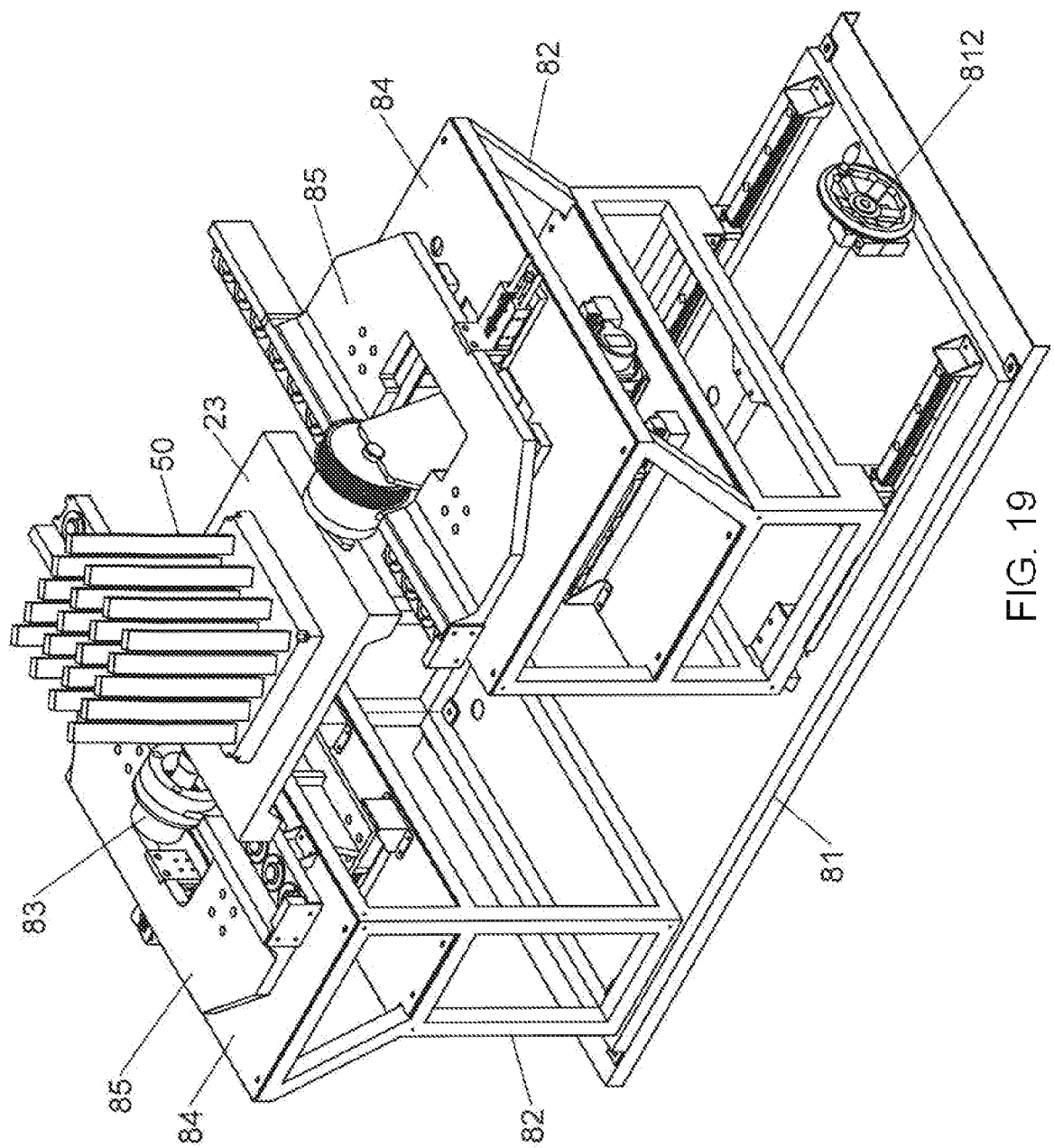
FIG. 19 is a perspective view showing a third operation state of the conveying mechanism of the print cutting machine.
Figure 20:
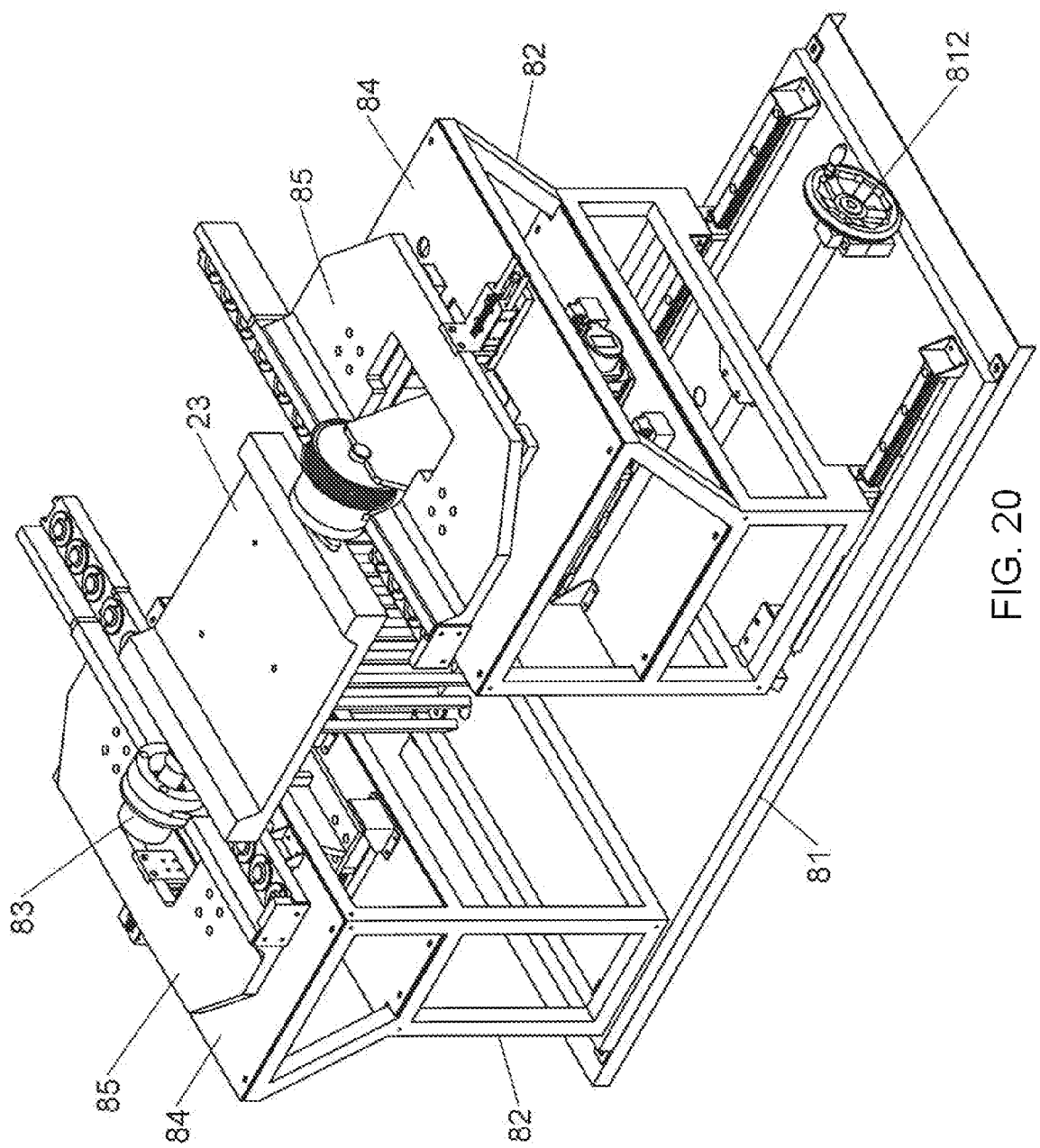
FIG. 20 is a perspective view showing a fourth operation state of the conveying mechanism of the print cutting machine.
Figure 21:
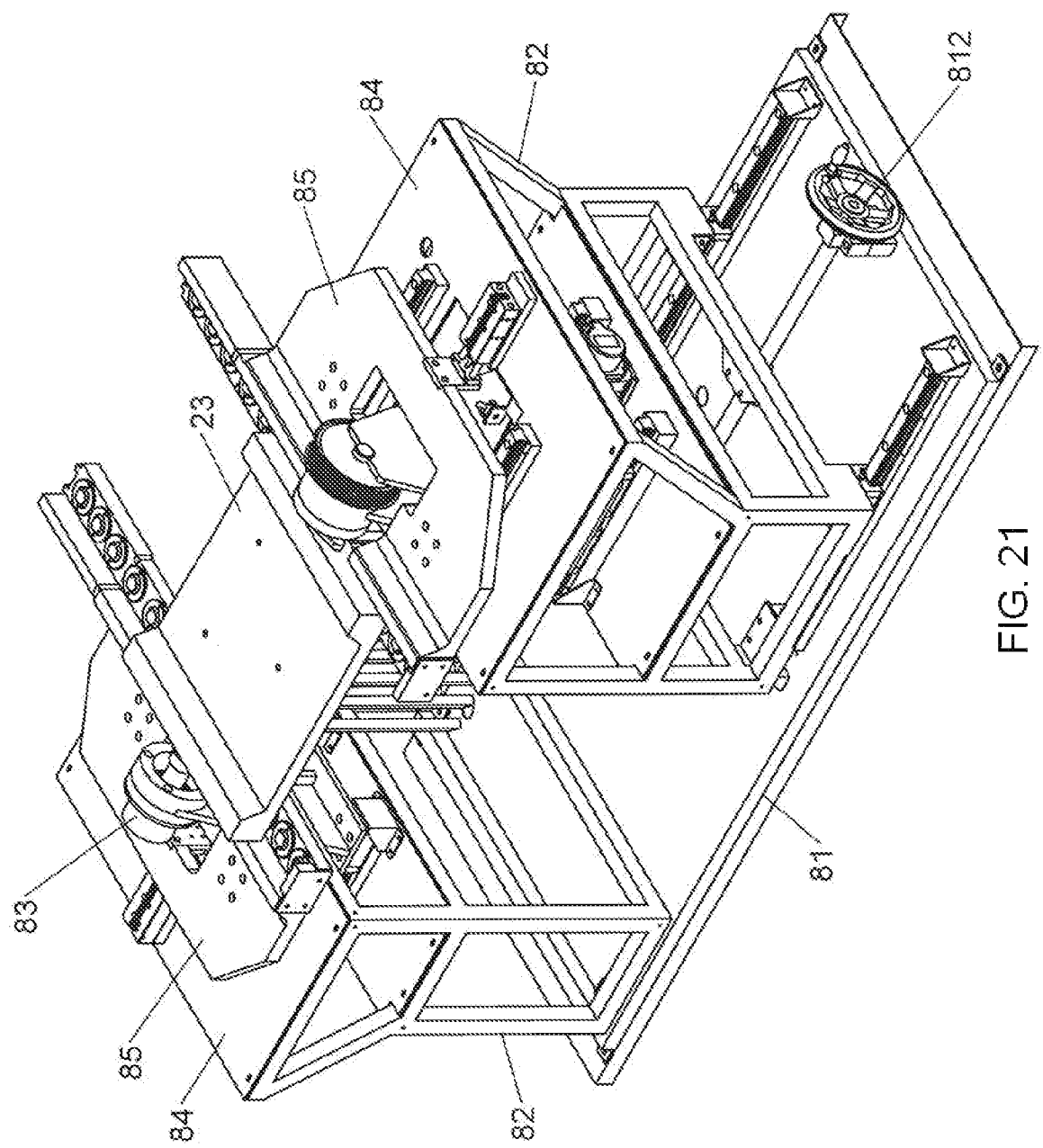
FIG. 21 is a perspective view showing a fifth operation state of the conveying mechanism of the print cutting machine.
Figure 22:
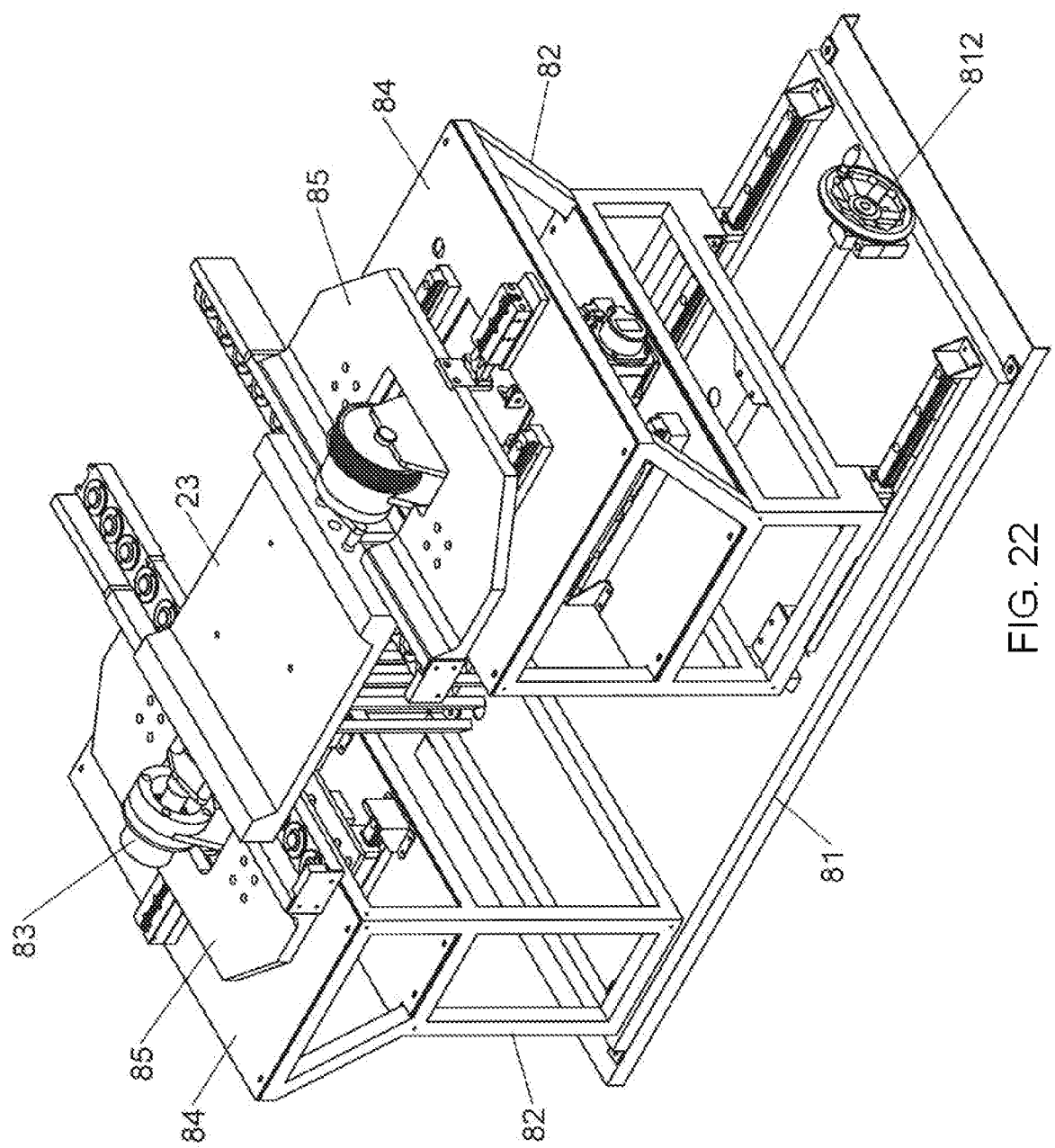
FIG. 22 is a perspective view showing a sixth operation state of the conveying mechanism of the print cutting machine.

In operation, the fitting seat 23 is placed on the fourth track 851. When the second moving element 822 is operated, the two rotation units 83 are moved to approach each other, so that the fixing portion 831 is inserted into the second fitting portions 232 as shown in FIG. 18. When the third moving element 842 is operated, the two fourth machine bases 85 are moved away from each other, so that the fitting seat 23 is detached from the fourth track 851 as shown in FIG. 19. When the power element 832 is operated, the first wheel 833 and the second wheel 834 are rotated to drive and invert the fitting seat 23 and the workpiece unit 50 as shown in FIG. 20. When the third moving element 842 is operated again, the two fourth machine bases 85 are moved to approach each other, so that the fitting seat 23 is situated on the fourth track 851 as shown in FIG. 21. When the second moving element 822 is operated again, the two rotation units 83 are moved away from each other, so that the fixing portion 831 is detached from the second fitting portions 232 as shown in FIG. 22. When the fourth track 851 aligns with the two first slide rails 13, the fitting seat 23 slides on the fourth track 851 into the two first slide rails 13, so that the fitting seat 23 and the workpiece unit 50 are moved into the receiving space 11 to perform a cutting process.

Accordingly, the print cutting machine of the present invention has the following advantages.

1. The cutting unit 30 performs a cutting action on the workpiece unit 50 without needing a manual cutting even if the at least one molded portion 52 is made of metallic material or other material with greater structural strength.

2. When the moving unit 20 is moved upward, the workpiece unit 50 is also moved upward so that the at least one cutout 521 aligns with the thread 35. The cutting unit 30 is then moved horizontally to perform the cutting action on the workpiece unit 50.

3. The first spool 31 is rotated to unwind the thread 35, and the second spool 32 is rotated to wind the thread 35. The thread 35 is stretched between the two support seats 34 and aligns with the at least one cutout 521. The thread 35 is curled and moved to cut the at least one cutout 521, so that the thread 35 is moved in two directions to cut the at least one cutout 521, to perform the cutting action exactly.

4. The thread 35 is wound around the first spool 31 and the second spool 32. The thread 35 in turn passes the first spool 31, the rollers 33, one of the two support seats 34, the other one of the two support seats 34, the rollers 33, and the second spool 32. The first spool 31 is rotated to unwind the thread 35, and the second spool 32 is rotated to wind the thread 35. The thread 35 is supported by and horizontally stretched between the two support seats 34. The thread 35 is moved between the two support seats 34 so that the thread 35 is unwound from the first spool 31 and wound around the second spool 32.

5. When the at least one molded portion 52 is cut, the at least one molded portion 52 falls into and gathered by the box 41, thereby preventing the at least one molded portion 52 from scattering everywhere.

6. The liquid is filled into the receiving space 11, to provide a buffering effect to the at least one molded portion 52, to prevent the at least one molded portion 52 from hitting the bottom of the box 41, thereby preventing the box 41 from being damaged.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A print cutting machine comprising:
a main body, a moving unit, a cutting unit, a receiving unit, and a workpiece unit;
wherein:
the main body has an interior provided with a receiving space having an open top and an open front;
the main body is provided with a first stand located at a rear side of the receiving space;
the first stand is provided with a vertical track;
the receiving space has two first slide rails provided on two sides thereof;
each of the two first slide rails is a horizontal track;
the main body has two second slide rails provided on two sides thereof;
each of the two second slide rails is a horizontal track having a height more than that of each of the two first slide rails;
the main body is provided with a monitor;
the moving unit is movably mounted on the first stand and includes a second stand, a moving seat, and a fitting seat;
the second stand is provided with a vertical track;
the second stand is mounted on the first stand and slides on the first stand linearly;
the moving seat is mounted on a bottom of the second stand and moved on the second stand linearly;
the fitting seat is mounted on a bottom of the moving seat and has a bottom provided with multiple first fitting portions;
each of the first fitting portions is a screw hole;
the fitting seat has two sides each provided with multiple second fitting portions;
each of the second fitting portions is a hole;
the cutting unit is mounted on the two second slide rails and moved the two second slide rails horizontally;
the cutting unit includes a first spool, a second spool, multiple rollers, two support seats, and a thread;
the first spool and the second spool are arranged at two sides of the receiving space;
the first spool is provided with a first power member which drives the first spool to rotate in one direction;
the second spool is provided with a second power member which drives the second spool to rotate in another direction;
the first spool and the second spool are rotated in different directions;
each of the first spool and the second spool is a cylinder;
the rollers are arranged beneath the first spool and the second spool and are located at different height positions;
each of the rollers is an idler wheel;
the two support seats are arranged beneath the rollers and are opposite to each other;
the thread is wound around the first spool and the second spool;
the thread in turn passes the first spool, the rollers, one of the two support seats, the other one of the two support seats, the rollers, and the second spool;
the first spool is rotated to unwind the thread, and the second spool is rotated to wind the thread;
the thread is supported by and horizontally stretched between the two support seats;
the thread is moved between the two support seats;
the two support seats and the thread are received in the receiving space to perform a cutting process;
the receiving unit is received in the receiving space and has a height less than that of the two first slide rails;
the receiving unit includes a box and a first door;
the box has an open top with an opening aligning with a bottom of the moving unit;
the first door is pivotally mounted on a front of the box and aligns with the front of the receiving space;
the first door is movable relative to the box to open or close the box;
the workpiece unit is assembled with the moving unit;
when the moving unit is moved upward vertically, the moving unit drives the workpiece unit to move vertically;
the workpiece unit includes a base, at least one molded portion mounted on the base, and at least one cutout formed between the base and the at least one molded portion;
the base is assembled with the fitting seat and provided with multiple third fitting portions;
the third fitting portions are assembled with the first fitting portions by multiple screws;
the third fitting portions are arranged on four corners of the base;
the at least one molded portion and the at least one cutout are received in the receiving unit;
a second door is mounted on the open front of the receiving space;
the second door is movable relative to the main body to open or close the main body;
the second door is directly removed from the main body;
a third door is mounted on the second door and aligns with the moving unit;
the third door is movable relative to the second door to open or close the second door; and
the third door is directly removed from the second door.

2. The print cutting machine as claimed in claim 1, wherein the cutting unit is moved to cut the workpiece unit.

3. The print cutting machine as claimed in claim 1, wherein the workpiece unit includes multiple molded portions and multiple cutouts, the molded portions are arranged to form a matrix, and a distance is defined between the molded portions.

4. The print cutting machine as claimed in claim 1, wherein:
the workpiece unit is initially assembled with the fitting seat;
the fitting seat and the workpiece unit are moved into the receiving space;
the fitting seat is situated on the two first slide rails and moved on the two first slide rails horizontally;
the fitting seat is then assembled with the moving seat; and
when the moving unit is moved vertically, the moving seat is moved away from the two first slide rails.

5. The print cutting machine as claimed in claim 1, wherein the at least one molded portion is made of metallic or nonmetallic material and is printed by a three-dimensional printer.

6. The print cutting machine as claimed in claim 1, wherein:
the second door is removed from the main body, and the third door is removed from the second door;
the fitting seat is situated on the two first slide rails;
the cutting unit is mounted on the two second slide rails;
the receiving unit is received in the receiving space;
the workpiece unit is assembled with the bottom of the moving unit;
the at least one molded portion is received in the box;
after the second door is mounted on the main body, and the third door is mounted on the second door, liquid is filled into the receiving space, so that the receiving unit and the workpiece unit are immersed in the liquid partially or entirely;
the workpiece unit is moved upward with the moving unit, so that the at least one cutout aligns with the thread;
the cutting unit is then moved horizontally, with the first spool being rotated to unwind the thread, and with the second spool being rotated to wind the thread;
the thread is stretched between the two support seats and aligns with the at least one cutout;
the thread is curled and moved to cut the at least one cutout, so that the at least one molded portion is dropped into and gathered by the box; and
the liquid is filled into the receiving space, to provide a buffering effect to the at least one molded portion, to prevent the at least one molded portion from hitting the bottom of the box, thereby preventing the box from being damaged.

7. The print cutting machine as claimed in claim 1, further comprising:
a conveying mechanism for inverting and delivering the workpiece unit and the fitting seat into the receiving space;
wherein:
the conveying mechanism includes a first machine base, two second machine bases, two rotation units, two third machine bases, and two fourth machine bases;
the first machine base is a sheet plate with determined length and width;
the first machine base is provided with two first tracks located at two sides thereof;
the first machine base is provided with a first moving element located between the two first tracks;
the first moving element is a threaded rod that is rotated to provide a micro-adjusting function;
a first one of the two second machine bases is mounted on the first machine base;
a second one of the two second machine bases is mounted on the two first tracks and assembled with the first moving element;
the second one of the two second machine bases is moved on the two first tracks horizontally to adjust a distance between the two second machine bases;
each of the two second machine bases is provided with two second tracks;
each of the two second machine bases is provided with a second moving element located between the two second tracks;
the second moving element includes an oil cylinder structure or a pneumatic cylinder structure;
each of the two rotation units is mounted on the two second tracks respectively;
the two rotation units clamp the fitting seat and invert the fitting seat and the workpiece unit;
each of the two rotation units is mounted on the second moving element;
each of the two rotation units includes a fixing portion, a power element, a first wheel, a second wheel, and an adjusting portion;
the fixing portion aligns with the second fitting portions;
the power element is a power source of each of the two rotation units;
the second wheel is arranged above the first wheel;
the fixing portion is mounted on the second wheel;
the workpiece unit is initially assembled with the fitting seat by multiple screws;
when the second moving element is operated, the second moving element drives each of the two rotation units to move on the two second tracks horizontally, so that the two rotation units approach each other;
when the fixing portion is locked on the second fitting portions, the two rotation units clamp the fitting seat;
the power element drives the first wheel, the second wheel, and the fixing portion to rotate through one hundred and eighty degrees, so that the fitting seat and the workpiece unit are inverted and rotated through one hundred and eighty degrees;
when the second moving element is operated reversely, the second moving element drives each of the two rotation units to move reversely, so that the two rotation units are away from each other, and the fixing portion is detached from the second fitting portions;
the two third machine bases are mounted on the two second machine bases respectively;
each of the two third machine bases is provided with two third tracks, a third moving element, and a slot;
the slot allows passage of each of the two rotation units;
the third moving element includes an oil cylinder structure or a pneumatic cylinder structure;
the two fourth machine bases are assembled with the two third machine bases respectively;
the third moving element is operated to drive each of the two fourth machine bases so that each of the two fourth machine bases is moved on the two third tracks, and the two fourth machine bases are moved to be close to each other or away from each other;
each of the two fourth machine bases is provided with a fourth track;
the fitting seat is slidable on the fourth track;

the fourth track has a height equal to that of each of the two first slide rails so that the fitting seat slides on the fourth track into the two first slide rails, and the workpiece unit is moved into the receiving space;

the two rotation units are slidable relative to the two second machine bases respectively, the two third machine bases are mounted on the two second machine bases respectively, and the two fourth machine bases are slidable relative to the two third machine bases respectively, so that the two rotation units are moved independently, and the two fourth machine bases are moved independently.

* * * * *